United States Patent
Lee et al.

(10) Patent No.: US 12,486,238 B2
(45) Date of Patent: Dec. 2, 2025

(54) COMPOUND HAVING ANTIBACTERIAL FUNCTION AGAINST SUPERBACTERIA AND SELECTIVE DETECTION FUNCTION OF HYPOCHLOROUS ACID, AND COMPOSITION AND SENSOR COMPRISING THE SAME

(71) Applicant: Pukyong National University Industry—University Cooperation Foundation, Busan (KR)

(72) Inventors: Song Yi Lee, Busan (KR); Thanh Chung Pham, Busan (KR); Yeong Hwan Choi, Busan (KR)

(73) Assignee: Pukyong National University Industry—University Cooperation Foundation, Busan (KR)

( * ) Notice: Subject to any disclaimer, the term of this patent is extended or adjusted under 35 U.S.C. 154(b) by 750 days.

(21) Appl. No.: 17/705,007

(22) Filed: Mar. 25, 2022

(65) Prior Publication Data

US 2022/0388966 A1    Dec. 8, 2022

(30) Foreign Application Priority Data

May 13, 2021 (KR) .......................... 10-2021-0061941

(51) Int. Cl.
| | | |
|---|---|---|
| A61B 5/00 | (2006.01) | |
| A61B 8/00 | (2006.01) | |
| A61B 10/00 | (2006.01) | |
| A61K 31/4184 | (2006.01) | |
| A61K 49/00 | (2006.01) | |
| C07D 235/02 | (2006.01) | |
| C07D 403/06 | (2006.01) | |
| G01N 33/58 | (2006.01) | |

(52) U.S. Cl.
CPC ........ C07D 235/02 (2013.01); A61K 31/4184 (2013.01); A61K 49/0021 (2013.01); C07D 403/06 (2013.01); G01N 33/582 (2013.01); G01N 2800/26 (2013.01)

(58) Field of Classification Search
CPC ................ C07D 235/02; C07D 403/06; A61K 31/4184; A61K 49/0021; A61K 31/403; G01N 33/582; G01N 2800/26; G01N 21/6428; G01N 33/52; G01N 33/84; G01N 2333/195; C09B 11/02; C09B 69/103; Y02A 50/30; A61P 31/04
See application file for complete search history.

(56) References Cited

U.S. PATENT DOCUMENTS

2022/0016099 A1    1/2022    Shin et al.

FOREIGN PATENT DOCUMENTS

| JP | 2002/268171 | 9/2002 | |
|---|---|---|---|
| WO | 2016/129806 | 8/2016 | |
| WO | WO-2016129806 A2 * | 8/2016 | ........... C07D 235/04 |

OTHER PUBLICATIONS

Sauerbrey et al. (Heteroatom Chem. vol. 23, No. 6, 2012).*
Saeed et al. (Med. Chem. Res. (2007) 16:143-154).*
Sep. 20, 2023, 10-2021-0061941, KR.
Saravanakumar, S. et al., "Anellated N-heterocyclic carbenes: 1,3-dineopentylnaphtho[2,3-d]imidazole-2-ylidene: synthesis, KOH addition product, transition-metal complexes, and anellation effects", Chemistry—A European Journal, vol. 12, No. 11, pp. 3143-3154, (2006).
Tolpygin, I.E. et al., "Chemosensors based on $N^2$-(anthracen-9-ylmethyl)-naphthalene-2,3-diamine", Russian Journal of Organic Chemistry, vol. 47, No. 9, pp. 1305-1309, (2011).
Wu, D. et al., "Design principles, sensing mechanisms, and applications of highly specific fluorescent probes for HOCl/OCl", Accounts of Chemical Research, vol. 52, No. 8, pp. 2158-2168, (2019).
Zhu, Z. et al., "Design, synthesis, and biological evaluation of tricyclic nucleosides (dimensional probes) as analogues of certain antiviral polyhalogenated benzimidazole ribonucleosides", Journal of Medicinal Chemistry, vol. 43, No. 12, pp. 2430-2437, (2000).
CAS Registry No. 81863-96-9, "2H-Naphth[2,3-d]imidazole-2-thione, 1,3-dihydro-4-methyl-", 1 page, Nov. 16, 1984.

* cited by examiner

Primary Examiner — Jake M Vu
Assistant Examiner — Melissa J Perreira
(74) Attorney, Agent, or Firm — EVAN LAW GROUP LLC

(57) ABSTRACT

The present disclosure relates to a novel compound having an antibacterial function against superbacteria and a hypochlorous acid selective detection function, and a composition and a fluorescent sensor which comprise the same, and more particularly to, a novel imidazoline-2-thione based compound, a composition comprising the same, and a fluorescent sensor for bacterial detection and hypochlorous acid selective detection.

12 Claims, 9 Drawing Sheets

COMPOUND HAVING ANTIBACTERIAL FUNCTION AGAINST SUPERBACTERIA AND SELECTIVE DETECTION FUNCTION OF HYPOCHLOROUS ACID, AND COMPOSITION AND SENSOR COMPRISING THE SAME

CROSS-REFERENCE TO RELATED APPLICATION

This application claims the benefit of Korean Patent Application No. 10-2021-0061941 filed on May 13, 2021, in the Korean Intellectual Property Office, the entire disclosure of which is incorporated herein by reference for all purposes.

BACKGROUND

1. Field of the Invention

The present disclosure relates to a novel compound having an antibacterial function against superbacteria and a hypochlorous acid selective detection function, and a composition and a sensor which comprise the same.

2. Description of the Related Art

With the recent emergence of superbacteria that are resistant to antibiotics, mankind around the world is facing great danger. In particular, bacteria such as methicillin-resistant Staphylococcus aureus (MRSA) or extended spectrum β-lactamase-producing Escherichia coli (ESBL-EC) are the most threatening pathogens facing mankind in the 21st century. Bacterial resistance to antibiotics, which are generally developed targeting one of specific components of bacterial cells such as cell walls, and RNA, inevitably causes genetic mutations in bacteria. In order to overcome such antibiotic resistance, an antibacterial compound which targets a wide range of bacterial components or is difficult for bacteria to have resistance should be developed. Further, it is desperately needed to study a new concept material which may effectively and easily detect and simultaneously destroy these bacterial infections at the same time through fluorescence changes.

SUMMARY

In order to solve the above-mentioned problems, the present disclosure provides a novel compound which may be applied as a fluorescent dye for hypochlorous acid ($OCl^-$) selective detection and fluorescence imaging as well as antibacterial function.

The present disclosure provides a composition which includes a compound according to the present disclosure and is for antibacterial function and/or hypochlorous acid ($OCl^-$) selective detection and fluorescence imaging.

The present disclosure relates to a fluorescent sensor for detection and fluorescence imaging of hypochlorous acid ($OCl^-$), including a compound according to the present disclosure.

The present disclosure relates to a probe for detecting bacteria, including a compound according to the present disclosure.

However, the problems to be solved by the present disclosure are not limited to those mentioned above, and other problems not mentioned will be clearly understood by those with ordinary skill in the art from the description below.

An aspect of the present disclosure relates to a compound represented by Chemical Formula 1 below.

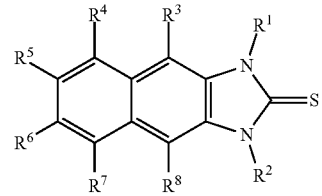

[Chemical Formula 1]

(where, $R^1$ to $R^2$ are each selected from hydrogen; halogen; linear or branched $C_1$-$C_{30}$ alkyl; $C_2$-$C_{30}$ alkenyl; $C_2$-$C_{30}$ alkynyl; a substituted or unsubstituted $C_6$-$C_{30}$ monoatomic single or polycyclic aryl group; a substituted or unsubstituted $C_5$-$C_{30}$ heteroatomic single or polycyclic aryl group; and —R-L (R is $C_1$-$C_{30}$ alkylene or $C_2$-$C_{30}$ alkenylene, and L is a substituted or unsubstituted $C_6$-$C_{30}$ monoatomic single or polycyclic aryl group; and a substituted or unsubstituted $C_5$-$C_{30}$ heteroatomic single or polycyclic aryl group.), in the polycyclic aryl group, two or more aromatic rings are condensed, or two or more aromatic rings are connected, the substitution is made by at least one substituent of heavy hydrogen, halogen, linear or branched $C_1$-$C_{30}$ alkyl, and $C_2$-$C_{30}$ alkenyl, and $R^3$ to $R^8$ are each selected from hydrogen, halogen, linear or branched $C_1$-$C_{30}$ alkyl, and $C_2$-$C_{30}$ alkenyl.)

According to an example embodiment of the present disclosure, at least one of $R^1$ to $R^2$ above may be selected from the following.

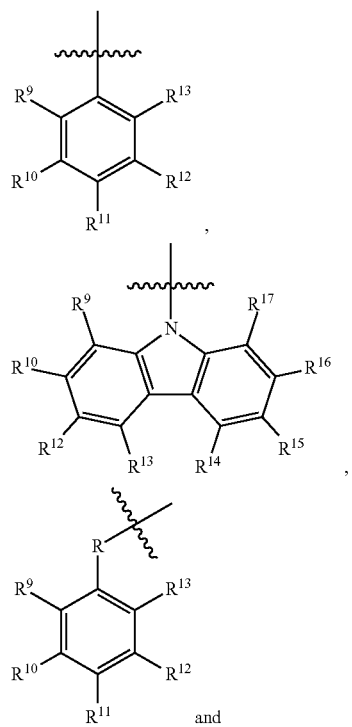

and

-continued

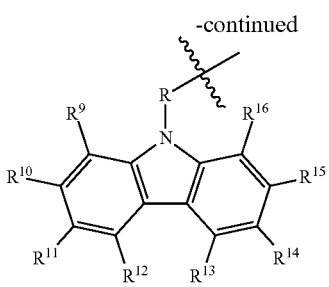

(where, R is $C_1$-$C_{30}$ alkylene or $C_2$-$C_{30}$ alkenylene, and $R^9$ to $R^{16}$ are each selected from hydrogen, halogen, linear or branched $C_1$-$C_{20}$ alkyl, and $C_2$-$C_{20}$ alkenyl.)

According to an example embodiment of the present disclosure, one of R1 to R2 may be selected from hydrogen, halogen, linear or branched C1-C30 alkyl, and C2-C30 alkenyl, and the other one may be selected from the following.

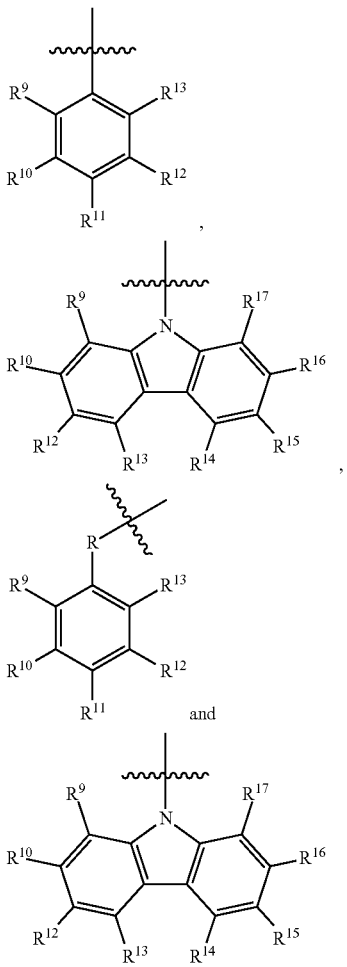

(where, R is $C_1$-$C_{30}$ alkylene or $C_2$-$C_{30}$ alkenylene, and $R^9$ to $R^{17}$ are each selected from hydrogen; halogen; linear or branched $C_1$-$C_{20}$ alkyl; and $C_2$-$C_{20}$ alkenyl.)

According to an example embodiment of the present disclosure, the compound may have fluorescence imaging and antibacterial functions for hypochlorous acid (OCl⁻).

Another aspect of the present disclosure relates to a composition including a compound represented by Chemical Formula 1 above according to the present disclosure, a salt thereof, or both thereof.

According to an example embodiment of the present disclosure, the salt may be a pharmaceutically acceptable salt, and the composition may be an antibacterial composition having antibacterial activity.

According to an example embodiment of the present disclosure, the composition may be used for hypochlorous acid (OCl⁻) selective detection and fluorescence imaging in vivo or ex vivo.

According to an example embodiment of the present disclosure, the composition may be one which is used for hypochlorous acid (OCl⁻) selective detection and fluorescence imaging in bacterially infected cells in vivo or ex vivo, and has antibacterial activity.

According to an example embodiment of the present disclosure, the composition may further include water, an organic solvent, or both thereof, and have a pH of 7 to 8.

Another aspect of the present disclosure relates to a probe for detecting bacteria, including the compound represented by Chemical Formula 1 according to the present disclosure, a salt thereof, or both thereof, and having a selective optical property change for hypochlorous acid (OCl⁻) in bacterially infected cells.

According to an example embodiment of the present disclosure, the probe for detecting bacteria may have an antibacterial function.

Another aspect of the present disclosure relates to a sensor for the detection of hypochlorous acid (OCl⁻), including the compound represented by Chemical Formula 1 of claim 1, a salt thereof, or both thereof, and having a selective optical property change for hypochlorous acid (OCl⁻).

According to an example embodiment of the present disclosure, the sensor may be a fluorescent sensor, and the sensor may measure a fluorescence signal or perform fluorescence imaging.

According to an example embodiment of the present disclosure, the sensor may measure a change in fluorescence intensity according to Equation 1 below.

$(I/I_0) \geq 10$ ($I$:fluorescence intensity after hypochlorous acid($OCl^-$)contact,$I_0$:initial fluorescence intensity)     [Equation 1]

According to an example embodiment of the present disclosure, the sensor may have a detection limit for hypochlorous acid (OCl⁻) of 5 μM or less.

Additional aspects of example embodiments will be set forth in part in the description which follows and, in part, will be apparent from the description, or may be learned by practice of the disclosure.

According to an example embodiment of the present disclosure, the present disclosure may provide an imidazoline-2-thione ($R_1SR_2$) based compound, which is a novel organic phosphor having an antibacterial function, and the compound can selectively detect hypochlorous acid (ClO—), which is one of the reactive oxygen species (ROS) generated according to the bacterial infection, and can exhibit antibacterial effect against superbacteria at the same time.

According to an example embodiment of the present disclosure, the present disclosure may provide a fluorescent probe and fluorescent sensor for diagnosing and/or detecting a superbacterial infection as well as a superbacteria antibacterial agent by using the compound according to the present disclosure.

According to an example embodiment of the present disclosure, the present disclosure may provide a fluorescent sensor for the detection and/or quantitative/qualitative analysis of hypochlorous acid using the compound according to the present disclosure.

BRIEF DESCRIPTION OF THE DRAWING

These and/or other aspects, features, and advantages of the invention will become apparent and more readily appreciated from the following description of example embodiments, taken in conjunction with the accompanying drawings of which.

DETAILED DESCRIPTION

Figure 1:
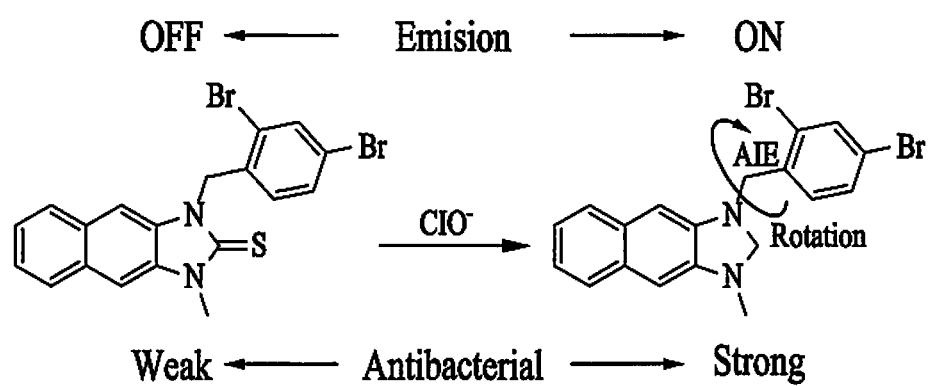
FIG. 1 exemplarily shows the fluorescence mechanism of a novel compound according to the present disclosure, according to an example embodiment of the present disclosure.

Hereinafter, examples of the present disclosure will be described in detail. When it is determined detailed description related to a related known function or configuration they may make the gist of the present disclosure unnecessarily ambiguous in describing the present disclosure, the detailed description will be omitted. Also, terms used in the present specification, as terms used to appropriately describe preferred examples of the present disclosure, may be changed depending on a user, the intent of an operator, a custom of a field to which the present disclosure pertains, or the like. Accordingly, definitions of the present terms should be made based on the contents throughout the present specification.

Throughout the specification, when any member is positioned "on" the other member, this not only includes a case that the any member is brought into contact with the other member, but also includes a case that another member exists between two members.

Throughout the specification, if a prescribed part "includes" a prescribed element, this means that another element may be further included instead of excluding another element.

The present disclosure relates to an imidazoline-2-thione based compound, which is a novel organic phosphor. According to an example embodiment of the present disclosure, the imidazoline-2-thione based compound includes a compound ($R_1SR_2$) represented by Chemical Formula 1 below, and the compound has antibacterial activity against bacteria, and corresponds to a fluorescent material which may be utilized for diagnosis and detection of bacterial infection by selective hypochlorous acid (ClO$^-$) detection. Further, the compound may be capable of performing fluorescence imaging for hypochlorous acid (OCl$^-$).

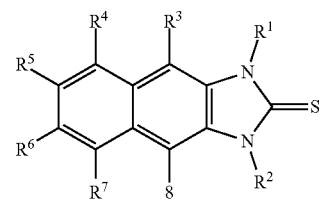

In an example of the present disclosure, $R^1$ to $R^2$ in Chemical Formula 1 above may be each selected from hydrogen; halogen; linear or branched $C_1$-$C_{30}$ alkyl; $C_2$-$C_{30}$ alkenyl; $C_2$-$C_{30}$ alkynyl; a substituted or unsubstituted $C_6$-$C_{30}$ monoatomic single or polycyclic aryl group; a substituted or unsubstituted $C_5$-$C_{30}$ heteroatomic single or polycyclic aryl group; and —R-L (R is $C_1$-$C_{30}$ alkylene or $C_2$-$C_{30}$ alkenylene, and L is a substituted or unsubstituted $C_6$-$C_{30}$ monoatomic single or polycyclic aryl group; and a substituted or unsubstituted $C_5$-$C_{30}$ heteroatomic single or polycyclic aryl group).

For example, all of $R^1$ to $R^2$ are not hydrogen, and at least one of $R^1$ to $R^2$ may be selected from the above-mentioned substituent range except for hydrogen.

For example, the halogen may be selected from —F, —Br, —Cl, and —I.

For example, the alkyl may be $C_1$-$C_{30}$ alkyl; $C_1$-$C_{20}$ alkyl; $C_1$-$C_{10}$ alkyl; or $C_1$-$C_5$ alkyl, and may be a straight chain or a branched chain.

For example, the alkenyl may be $C_2$-$C_{30}$ alkenyl; $C_2$-$C_{20}$ alkenyl; $C_2$-$C_{10}$ alkenyl; or $C_2$-$C_5$ alkenyl, and may be a straight chain or a branched chain.

For example, the alkynyl may be $C_2$-$C_{30}$ alkynyl; $C_2$-$C_{20}$ alkynyl; $C_2$-$C_{10}$ alkynyl; or $C_2$-$C_5$ alkynyl, and may be a straight chain or a branched chain.

For example, the aryl may be $C_6$-$C_{30}$ aryl; $C_6$-$C_{20}$ aryl; $C_6$-$C_{14}$ aryl; or $C_6$-$C_{10}$ aryl.

For example, the heteroaryl may be $C_5$-$C_{30}$ heteroaryl; $C_5$-$C_{20}$ heteroaryl; $C_5$-$C_{14}$ heteroaryl; or $C_5$-$C_{10}$ heteroaryl, at least one of the rings may contain at least 1 to 3 heteroatoms, and the heteroatom may be selected from N, O, or S heteroatom.

For example, the polycyclic aryl is one in which two or more aromatic rings are condensed, or two or more aromatic rings are connected.

For example, the substitution may be made by at least one substituent of heavy hydrogen, halogen, linear or branched $C_1$-$C_{30}$ alkyl, and $C_2$-$C_{30}$ alkenyl.

In an example of the present disclosure, at least one of $R^1$ to $R^2$ above may be selected from the following:

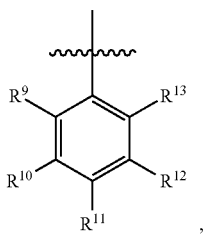

,

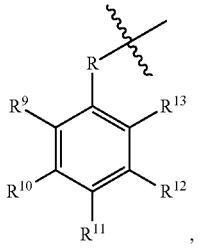

,

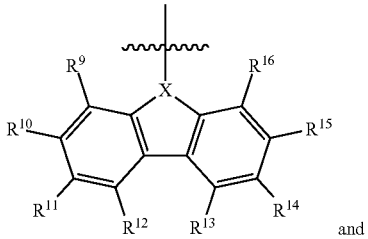

and

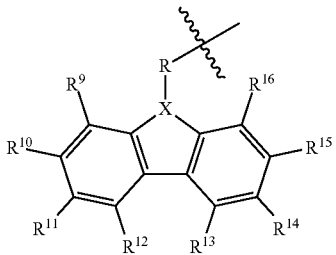

(where, R may be $C_1$-$C_{30}$ alkylene or $C_2$-$C_{30}$ alkenylene, $R^9$ to $R^{16}$ may be each selected from hydrogen, halogen, linear or branched $C_1$-$C_{20}$ alkyl, and $C_2$-$C_{20}$ alkenyl, and X may be N, O or S.)

Preferably, one of R1 to R2 may be selected from halogen, linear or branched C1-C30 alkyl, and C2-C30 alkenyl respectively, and the other one may be selected from the following:

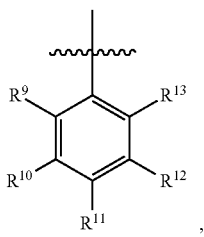

,

-continued

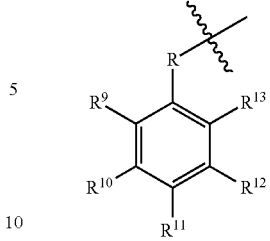

,

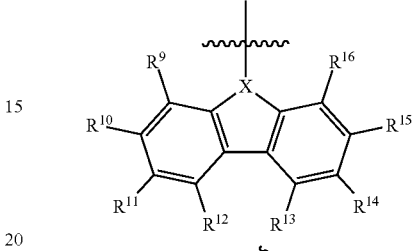

and

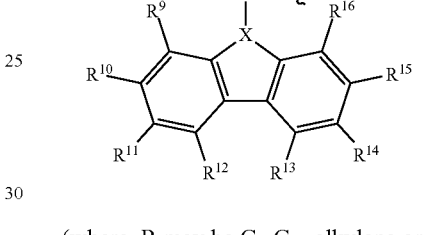

(where, R may be $C_1$-$C_{30}$ alkylene or $C_2$-$C_{30}$ alkenylene, $R^9$ to $R^{16}$ may be each selected from hydrogen, halogen, linear or branched $C_1$-$C_{20}$ alkyl, and $C_2$-$C_{20}$ alkenyl, and X may be N, O or S.)

According to an example embodiment of the present disclosure, there may be provided a probe for detecting bacteria, including the compound represented by Chemical Formula 1 above, a salt thereof, or both thereof. The probe for detecting bacteria is one which has a selective optical property change for hypochlorous acid (OCl⁻) in bacterially infected cells, and it may be used as a selective detection sensor (probe) for hypochlorous acid (OCl⁻) ex vivo and/or in vivo and a fluorescent dye for fluorescent imaging agents. The probe for detecting bacteria may provide selective fluorescence imaging for hypochlorous acid (OCl⁻) while having an antibacterial function.

The present disclosure relates to a compound according to the present disclosure, a salt thereof, or a composition including both thereof. According to an example embodiment of the present disclosure, the composition is one which utilizes the antibacterial function of the organic dye compound according to the present disclosure and the selective reaction and optical property change of hypochlorous acid (OCl⁻), and may be, for example, an antibacterial composition having antibacterial activity; and a multifunctional composition having at least one function of: a bacterial detection, diagnosis and analysis function; an antibacterial function; and a selective detection and fluorescence imaging function of hypochlorous acid.

According to an example embodiment of the present disclosure, the composition is a pharmaceutical composition for antibacterial activity and bacterial detection and/or diagnosis ex vivo and/or in vivo, and a composition for hypochlorous acid (OCl⁻) selective detection and fluorescence imaging ex vivo and/or in vivo. The composition is capable of detecting bacteria and/or diagnosing infection through hypochlorous acid (OCl⁻) selective detection and fluorescence imaging.

As an example of the present disclosure, it may be a composition including: the compound represented by Chemical Formula 1 above, a salt thereof, or both thereof; and a pharmaceutically acceptable carrier. The composition may be used for hypochlorous acid (OCl⁻) selective detection and fluorescence imaging in bacterially infected cells in vivo and/or ex vivo, and may exhibit antibacterial activity. As shown in FIG. 1, the compound represented by Chemical Formula 1 according to the present disclosure does not exhibit fluorescence and antibacterial effects in normal cells, and has no side effects on the normal cells, but when cells are infected with bacteria, hypochlorous acid (ClO⁻) is generated, it selectively reacts with hypochlorous acid (ClO⁻), and optical properties, for example, fluorescence is generated. That is, when the compound reacts with hypochlorous acid (ClO⁻) and is converted to imidazolium, it may exhibit fluorescence and antibacterial effects, and may detect and diagnose bacteria and perform fluorescence imaging through fluorescence changes.

As an example of the present disclosure, the salt is derived from an inorganic acid or an organic acid and a base, and may be a pharmaceutically acceptable salt. The inorganic and organic acids may be hydrochloric acid, hydrobromic acid, sulfuric acid, nitric acid, perchloric acid, fumaric acid, maleic acid, phosphoric acid, glycolic acid, lactic acid, salicylic acid, succinic acid, toluene-p-sulfonic acid, tartaric acid, acetic acid, citric acid, methanesulfonic acid, ethanesulfonic acid, formic acid, benzoic acid, malonic acid, sulfonic acid, naphthalene-2-sulfonic acid, benzenesulfonic acid, etc., but the present disclosure is not limited thereto.

As an example of the present disclosure, as long as the carrier does not deviate from the object of the present disclosure, components used in the technical field of the present disclosure may be applied. The compound represented by Chemical Formula 1 above, a pharmaceutically acceptable salt thereof; or both thereof may be included as a pharmaceutically active ingredient, and may be included in the composition in an amount of more than 0% to 99%; 0.0001% to 99%; and 0.001% to 99%. For example, it may be included in a concentration of $1 \times 10^{-5}$ M (mole) or more, preferably $1 \times 10^{-5}$M (mole) to $1 \times 10^{-2}$M (mole), and more preferably $1 \times 10^{-4}$ M (mole) to $1 \times 10^{-2}$ M (mole).

As an example of the present disclosure, the composition may have a pH of 7 to 8, which may be adjusted with a buffer solution.

According to an example embodiment of the present disclosure, the composition may be a composition for hypochlorous acid (OCl⁻) selective detection and fluorescence imaging, and may be used for qualitative and/or quantitative analysis of hypochlorous acid (OCl⁻).

According to an example embodiment of the present disclosure, the composition may be a composition for hypochlorous acid (OCl⁻) selective detection and fluorescence imaging, and may be used for qualitative and/or quantitative analysis of hypochlorous acid (OCl⁻).

As an example of the present disclosure, the composition may be a sensor composition for hypochlorous acid (OCl⁻) selective detection and fluorescence imaging, including: the compound represented by Chemical Formula 1, a salt thereof, or both thereof; and a solvent.

As an example of the present disclosure, the solvent may be one which is capable of dissolving and/or diluting the compound represented by Chemical Formula 1 above and a salt thereof so as to have a sensor function, and may include water, an organic solvent, or both thereof; and the organic solvent may be $C_1$-$C_4$ alcohols, THF, dimethylsulfoxide (DMSO), etc., but the present disclosure is not limited thereto.

As an example of the present disclosure, the compound represented by Chemical Formula 1 above, a salt thereof, or both thereof may be included in the composition in an amount of more than 0% to 99%; 0.0001% to 99%; and 0.001% to 99%. For example, it may be included in a concentration of $1 \times 10^{-5}$ M (mole) or more, preferably $1 \times 10^{-5}$M (mole) to $1 \times 10^{-2}$ M (mole), and more preferably $1 \times 10^{-4}$ M (mole) to $1 \times 10^{-2}$ M (mole), and when the concentration is less than $10^{-5}$ M (mole), observation may not be easy when detecting hypochlorous acid (OCl⁻) by weak color change, absorbance, fluorescence wavelength, fluorescence intensity, etc. of the compound.

As an example of the present disclosure, the composition may have a pH of 7 to 8, which may be adjusted with a buffer solution.

As an example of the present disclosure, when the composition is in contact with hypochlorous acid (OCl⁻) in hypochlorous acid (OCl⁻) selective detection and fluorescence imaging in vivo or ex vivo, it may change optical properties, and for example, a change in at least one of color, fluorescence wavelength, fluorescence intensity, and absorbance may be observed. Further, color change or fluorescence intensity (or color development intensity) change is observed with the naked eye without special equipment so that the presence of hypochlorous acid (OCl⁻) may be confirmed. Furthermore, hypochlorous acid (OCl⁻) qualitative and/or quantitative analysis using UV-Vis spectroscopy, fluorescence spectroscopy, or the like, and fluorescence imaging using a confocal fluorescence intensity microscope or the like may be performed.

For example, the composition may exhibit a fluorescence luminescence characteristic of: 300 to 600 nm; or 300 to 500 nm, and the fluorescence intensity may be changed depending on before and after contact of the composition with hypochlorous acid (OCl⁻). That is, the change in fluorescence intensity according to Equation 1 below may be measured. This may confirm fluorescence enhancement by high sensitivity and selectivity to hypochlorous acid (OCl⁻), and it may be used in qualitative and quantitative analysis of hypochlorous acid (OCl⁻).

$(I/I_0) \geq A$ (I:fluorescence intensity after OCl⁻contact,$I_0$: initial fluorescence intensity, and A is an integer of:5 or more; 10 or more; 20 or more; 30 or more; or 10to100.)  [Equation 1]

As an example of the present disclosure, the detection limit of hypochlorous acid (OCl⁻) in the composition may be: 10 μM or less; 5 μM or less; 0.01 to 10 μM; and 0.1 to 5 μM, and such a low detection limit may provide selectivity as well as excellent sensitivity to hypochlorous acid (OCl⁻).

According to an example embodiment of the present disclosure, the composition may be applied as a powder, a gel, an emulsion, a liquid, or a molded article. The composition may be coated or impregnated on a substrate such as an analysis chip, an electric circuit, a fiber, pulp, a polymer film, a glass substrate, or the like to be applied to a sensor, etc.

As an example of the present disclosure, the composition may be a sensor composition for hypochlorous acid (OCl⁻) selective detection and fluorescence imaging, including: the compound represented by Chemical Formula 1, a salt thereof, or both thereof; and a solvent.

As an example of the present disclosure, the solvent may be one which is capable of dissolving and/or diluting the compound represented by Chemical Formula 1 above and a salt thereof so as to have a sensor function, and may include water, an organic solvent, or both thereof, and the organic solvent may be $C_1$-$C_4$ alcohols, THF, dimethylsulfoxide (DMSO), etc., but the present disclosure is not limited thereto.

As an example of the present disclosure, the compound represented by Chemical Formula 1 above, a salt thereof, or both thereof may be included in the composition in an amount of more than 0% to 99%; 0.0001% to 99%; and 0.001% to 99%. For example, it may be included in a concentration of $1\times10^{-5}$ M (mole) or more, preferably $1\times10^{-5}$ M (mole) to $1\times10^{-2}$ M (mole), and more preferably $1\times10^{-4}$ M (mole) to $1\times10^{-2}$ M (mole), and when the concentration is less than $10^{-5}$ M (mole), observation may not be easy when detecting hypochlorous acid ($OCl^-$) by weak color change, absorbance, fluorescence wavelength, fluorescence intensity, etc. of the compound.

The present disclosure relates to a sensor for detecting hypochlorous acid ($OCl^-$), including the compound represented by Chemical Formula 1 according to the present disclosure, a salt thereof, or both thereof, and the compound represented by Chemical Formula 1 above, a salt thereof, or both thereof may exhibit selective optical property changes to hypochlorous acid ($OCl^-$), for example, selective fluorescence luminescent properties.

As an example of the present disclosure, the sensor may be a fluorescent sensor, and may measure a selective fluorescence signal for hypochlorous acid ($OCl^-$) or perform fluorescence imaging. For example, changes in at least one of color, fluorescence wavelength, fluorescence intensity, and absorbance may be observed, and these changes may enable hypochlorous acid ($OCl^-$) to be quantitatively and qualitatively analyzed using the naked eye, a UV-Vis spectroscope, a fluorescence photometer, etc.

As an example of the present disclosure, the detection limit of hypochlorous acid ($OCl^-$) of the sensor may be, for example, 10 μM or less; 5 μM or less; 1 μM or less; 0.1 μM or less; 0.01 to 5 μM; 0.1 to 1 μM; or 0.13 μM to 0.1 μM, and such a low detection limit may provide high selectivity as well as excellent sensitivity to hypochlorous acid ($OCl^-$).

The present disclosure relates to a method for detecting and diagnosing bacteria using the compound represented by Chemical Formula 1 according to the present disclosure, a salt thereof, or both thereof. According to an example embodiment of the present disclosure, the method may include the steps of: contacting cells to be treated with the compound represented by Chemical Formula 1, a pharmaceutically acceptable salt thereof, or both thereof; and measuring and analyzing changes in optical properties in the contacted cell region.

As an example of the present disclosure, in the step of measuring and analyzing changes in optical properties, the fluorescence changes may be observed, and the fluorescence changes are measured and analyzed to determine whether the bacteria are detected or not and whether the bacteria are infected or not. The compound represented by Chemical Formula 1, a pharmaceutically acceptable salt thereof, or both thereof may be injected into or contacted with in vivo or ex vivo, or mammals, or non-human mammals so that the cells not only may determine whether there is an infection or not through fluorescence changes, but also may eradicate bacteria or treat infections through antibacterial activity against bacteria. The measurement and analysis may use analysis methods of the above-mentioned sensor or apply in vivo applicable analysis methods known in the technical field of the present disclosure, and are not specifically mentioned in the present specification.

As in the following, although described with reference to preferred embodiments of the present disclosure, it will be understood that those skilled in the art may variously modify and change the present disclosure within the range that is not deviated from the spirit and scope of the present disclosure as set forth in the claims below.

Preparation Example

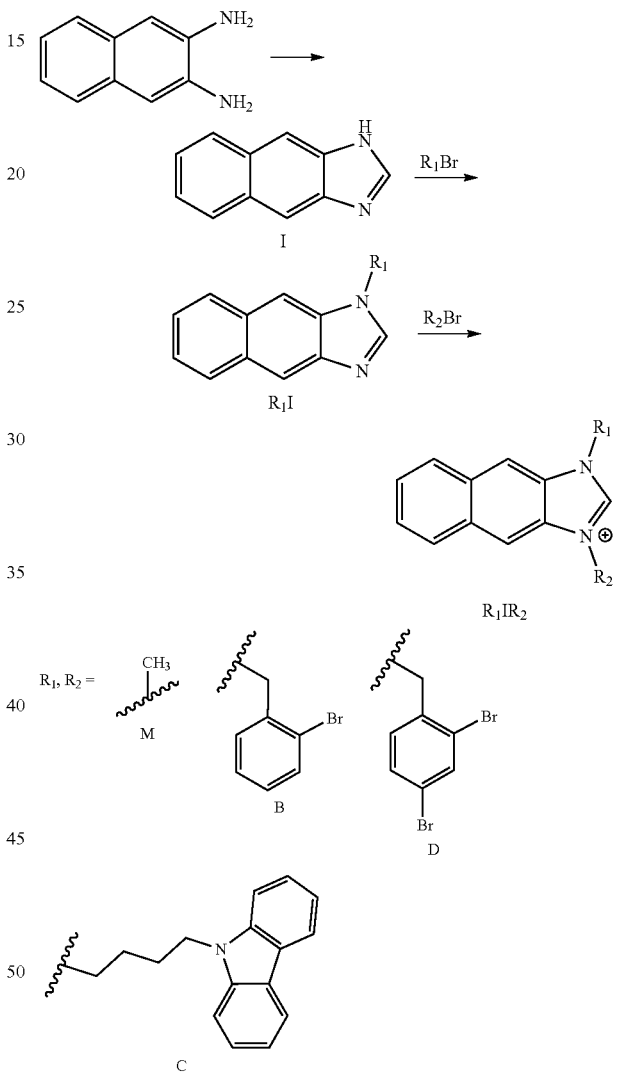

Synthesis Process of $R_1R_2$

Synthesis of DBr 3.0 g (12 mmol) of 2,4-Dibromotoluene was added to 50 mL of $CH_3CN$ containing 2.3 g (12.9 mmol) of NBS. The mixture was stirred and irradiated under a 25 W white lamp for 30 minutes. The reaction solution was evaporated and purified by silica gel column chromatography using n-hexane as an eluent to obtain a yellow oil as a pure product (yield of up to 95%).

$^1$H NMR (400 MHz, Chloroform-d) δ 7.72 (d, J=2.0 Hz, 1H), 7.41 (dd, J=8.2, 2.0 Hz, 1H), 7.30 (d, J=8.2 Hz, 1H), 4.52 (s, 2H). $^{13}$C NMR (101 MHz, CHLOROFORM-D) δ 136.61, 136.16, 132.67, 131.65, 125.52, 123.46, 32.82.

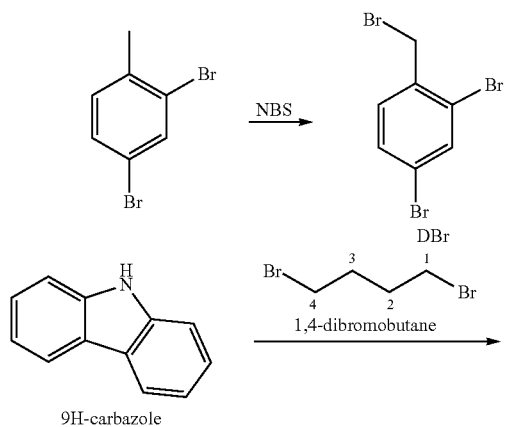

Synthesis Process of DBr and CBr

Synthesis of CBr

A mixture of 5.0 g of carbazole, 15 mL of benzene, 10 eq. of 1,4 dichlorobutane, benzyltriethylammonium chloride (phase transfer catalyst), and 15 mL (50%) of aqueous sodium hydroxide was stirred overnight. The obtained solution was acidified to a pH of about 3 with HCl, extracted with chloroform, and dried over anhydrous $Na_2SO_4$. After evaporation under reduced pressure, the viscous liquid was purified by silica gel column chromatography using n-hexane-DCM (9/1) as an eluent to obtain a brown powder as a pure product (yield of up to 65%).

$^1$H NMR (400 MHz, Chloroform-d) δ 8.10 (dq, J=7.7, 1.1 Hz, 2H), 7.46 (ddt, J=8.2, 7.1, 1.3 Hz, 2H), 7.36 (s, 2H), 7.28-7.19 (m, 2H), 4.29 (td, J=7.0, 1.3 Hz, 2H), 3.33 (t, J=6.5 Hz, 2H), 2.08-1.96 (m, 2H), 1.93-1.81 (m, 2H); $^{13}$C NMR (101 MHz, Chloroform-d) δ 140.43, 125.89, 123.04, 120.59, 119.11, 108.70, 42.26, 33.32, 30.37, 27.78; ESI HRMS m/z=302.0534 [M+H]$^+$, calc. for $C_{16}H_{16}BrN$=301.05.

Synthesis of I

A mixture of 2.0 g of 2,4-diaminonaphthalene and 20 mL of formic acid was refluxed at 100° C. for 24 hours. A NaOH solution (50%) was added to pH 9 to the obtained solution, extracted with chloroform, and dried over anhydrous $Na_2SO_4$. After evaporation, the crude product was purified by silica gel column chromatography using n-hexane-methanol (95/5) as an eluent to obtain a white powder as a pure product (yield of up to 75%). $^1$H NMR (400 MHz, Acetone-d$_6$) δ 8.43 (s, 1H), 8.15 (s, 2H), 7.99 (dt, J=6.0, 3.0 Hz, 2H), 7.42-7.34 (m, 2H). $^{13}$C NMR (101 MHz, DMSO-D$_6$) δ 147.08, 130.33, 128.42, 123.98. ESI HRMS m/z=169.0761 [M+H]$^+$, calc. for $C_{11}H_8N_2$=168.07.

Synthesis of $R_1I$ 200 mg of NaH was added to a mixture of 1.0 g (5.95 mmol) of I and 20 mL of tetrahydrofuran under an ice bath and the mixture was stirred for 30 minutes. Thereafter, 6.0 mmol of R-1Br or R2Br was added to the stirred mixture and the ice bath was removed. The mixture was refluxed under N2 overnight. After evaporation of the solvent, the reaction product was added with water and washed with MC. After the organic phase was collected and dried over anhydrous Na2SO4, evaporation was performed. The crude product was purified by silica gel column chromatography using n-hexane-ethyl acetate (9/1) as an eluent to obtain a brown powder as a pure product (yield of up to 50%).

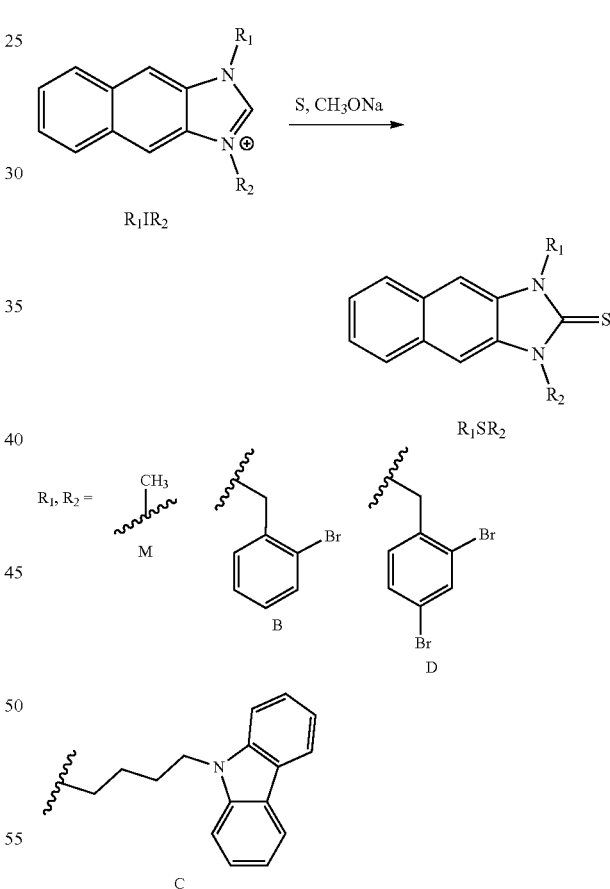

Synthesis Process of Imidazoline-2-thione (RISR2)

Synthesis of $R_1SR_2$

A mixture of 0.1 mmol of $R_1SR_2$, 1.0 mmol of sulfur, and 1.0 mmol of sodium methoxide was stirred at room temperature overnight in 20 mL of anhydrous methanol. After removal of the solvent, the crude product was extracted with an MC/DW phase. The organic phase was collected and dried over $Na_2SO_4$ The crude product was purified by silica gel column chromatography using the eluent H/MC (9/1) to obtain a white solid product (yield of up to 90%).

BSB: $^1$H NMR (400 MHz, Chloroform-d) δ 7.77 (dd, J=6.3, 3.3 Hz, 2H), 7.69-7.61 (m, 2H), 7.41-7.32 (m, 4H), 7.20-7.09 (m), 4H), 6.97-6.90 (m, 2H), 5.80 (s, 4H). $^3$C NMR (101 MHz, CHLOROFORM-D) δ 174.85, 134.28, 133.18, 131.93, 130.55, 129.36, 128.02, 127.84, 127.82, 125.25, 122.77, 105.92, 48.67. ESI HRMS m/z=536.9630 [M+H]$^+$, calc. for $C_{25}H_{18}Br_2N_2S$=535.96.

BSM: $^1$H NMR (400 MHz, Chloroform-d) δ 7.92-7.85 (m, 1H), 7.81-7.73 (m, 1H), 7.67-7.59 (m, 1H), 7.53 (s, 1H), 7.40 (pd, J=6.8, 1.6 Hz, 2H), 7.31 (s, 1H), 7.16-7.06 (m, 2H), 6.89-6.81 (m, 1H), 5.73 (s, 2H), 3.93 (d, J=0.6 Hz, 3H). $^{13}$C NMR (101 MHz, CHLOROFORM-D) δ 174.26, 134.36, 133.07, 132.92, 131.88, 130.53, 130.46, 129.24, 127.94, 127.86, 127.83, 127.70, 125.21, 125.09, 122.67, 105.70, 105.04, 48.35, 31.68. ESI HRMS m/z=383.0212 [M+H]$^+$, calc. for $C_{19}H_{15}BrN_2S$=382.01.

CSB: $^1$H NMR (400 MHz, Chloroform-d) δ 8.04 (dt, J=7.8, 0.9 Hz, 2H), 7.75 (d, J=7.5 Hz, 2H), 7.62 (dd, J=7.7, 1.6 Hz, 1H), 7.48-7.33 (m, 6H), 7.24-7.17 (m, 4H), 7.08 (dtd, J=16.7, 7.4, 1.7 Hz, 211), 6.82-6.75 (m, 1H), 5.69 (s, 2H), 4.42 (td, J=6.8, 2.1 Hz, 4H), 2.06 (dq, J=31.4, 7.4 Hz, 4H). $^{13}$C NMR (101 MHz, CHLOROFORM-D) δ 140.43, 133.08, 129.23, 127.94, 127.75, 125.82, 125.11, 122.99, 120.51, 119.03, 108.77, 105.76, 105.04, 77.42, 77.10, 76.78, 48.33, 44.73, 42.65. ESI HRMS m/z=612.1080 [M+Na]$^+$, calc. for $C_{34}H_{28}BrN_3S$=589.12.

CSC: $^1$H NMR (400 MHz, Chloroform-d) δ 8.03 (dt, J=7.9, 1.0 Hz, 4H), 7.74 (dd, J=6.3, 3.3 Hz, 2H), 7.46-7.35 (m, 10H), 7.23-7.13 (m, 6H), 4.34 (dt, J=18.7, 6.8 Hz, 8H), 2.10-2.00 (m, 4H), 1.94 (q, J=7.2 Hz, 4H), 1.30-1.20 (m, 4H), 0.90-0.79 (m, 4H). $^{13}$C NMR (101 MHz, CHLOROFORM-D) δ 172.90, 140.42, 131.88, 130.15, 127.69, 125.78, 124.96, 122.97, 120.49, 119.00, 108.77, 104.90, 77.42, 77.11, 76.79, 44.41, 42.64, 26.09, 25.31. ESI HRMS m/z=665.2709 [M+Na]$^+$, calc. for C43H38N4S=642.28.

CSD: $^1$H NMR (600 MHz, Chloroform-d) δ 8.03 (dt, J=7.7, 1.0 Hz, 2H), 7.79 (d, J=1.9 Hz, 1H), 7.75 (ddd, J=8.1, 2.2, 1.2 Hz, 2H), 7.45-7.37 (m, 6H), 7.23-7.16 (m, 5H), 6.67-6.64 (m, 1H), 5.61 (s, 2H), 4.41 (q, J=7.0 Hz, 4H), 2.14-1.96 (m, 4H). $^{13}$C NMR (101 MHz, CHLOROFORM-D) δ 173.81, 140.41, 135.38, 133.57, 131.64, 131.14, 130.29, 128.96, 127.78, 127.72, 125.82, 125.22, 123.16, 122.99, 121.99, 120.52, 119.05, 108.74, 105.56, 105.20, 77.42, 77.11, 76.79, 47.86, 44.76, 42.64, 26.05, 25.29. ESI HRMS m/z=690.0185 [M+Na]$^+$, calc. for $C_{34}H_{27}Br_2N_3S$=667.03.

CSM: $^1$H NMR (400 MHz, Chloroform-d) δ 8.04 (dt, J=7.7, 1.0 Hz, 2H), 7.74 (dd, J=6.6, 3.0 Hz, 2H), 7.62 (dd, J=7.7, 1.5) Hz, 1H), 7.48-7.33 (m, 6H), 7.26 (s, 7H), 7.24-7.15 (m, 4H), 7.08 (dtd, J=16.7, 7.4, 1.7 Hz, 2H), 6.78 (dd, J=7.4, 1.9 Hz, 1H), 5.69 (s, 2H), 4.42 (dd, J=7.3, 5.7 Hz, 4H), 2.10 (p, J=6.8 Hz, 2H), 2.01 (p, J=7.0) Hz, 2H). $^{13}$C NMR (101 MHz, CHLOROFORM-D) δ 173.25, 140.43, 132.81, 131.89, 130.28, 127.79, 127.63, 125.78, 125.03, 124.94, 122.96, 120.48, 119.00, 108.78, 104.91, 104.80, 44.47, 42.65, 31.31, 26.12, 25.38. ESI HRMS m/z=458.1661 [M+Na]$^+$, calc. for $C_{28}H_{25}N_3S$=435.18.

DSB: $^1$H NMR (400 MHz, Chloroform-d) δ 7.84-7.73 (m, 3H), 7.69-7.60 (m, 1H), 7.43-7.34 (m, 3H), 7.33 (s, 1H), 7.31-7.22 (m, 3H), 7.20-7.09 (m, 2H), 6.96-6.89 (m, 1H), 6.82 (dd, J=8.3, 0.8 Hz, 1H), 5.79 (s, 2H), 5.73 (s, 2H)). $^{13}$C NMR (101 MHz, CHLOROFORM-D) δ 174.80, 135.49, 134.20, 133.54, 133.21, 131.87, 131.74, 131.22, 130.60, 130.54, 129.41, 129.08, 128.02, 127.84, 127.79, 125.38, 123.27, 122.78, 122.13, 106.09, 105.72, 48.70, 48.21. ESI HRMS m/z=614.8735 [M+H]$^+$, calc. for $C_{25}H_{17}Br_3N_2S$=613.87.

DSD: $^1$H NMR (400 MHz, Chloroform-d) δ 7.84-7.74 (m, 4H), 7.40 (dd, J=6.3, 3.2 Hz, 2H), 7.34 (s, 2H), 7.28 (dd, J=8.3, 1.9 Hz, 2H), 6.80 (dd, J=8.3, 0.7 Hz, 2H), 5.72 (s, 4H). $^{13}$C NMR (101 MHz, CHLOROFORM-D) δ 174.73, 135.53, 133.44, 131.67, 131.22, 130.59, 129.05, 127.82, 125.50, 123.29, 122.20, 105.89, 48.24. ESI HRMS m/z=692.7840 [M+H]$^+$, calc. for $C_{25}H_{16}Br_4N_2S$=691.78.

DSM: $^1$H NMR (400 MHz, Chloroform-d) δ 7.93-7.85 (m, 1H), 7.79 (dd, J=7.5, 2.0 Hz, 2H), 7.53 (s, 1H), 7.48-7.36 (m, 2H), 7.28 (s, 1H), 7.22 (d, J=2.0 Hz, 3H), 6.74 (dd, J=8.3, 0.8 Hz, 1H), 5.66 (s, 2H), 3.92 (s, 3H). $^{13}$C NMR (101 MHz, CHLOROFORM-D) δ 174.15, 135.38, 133.61, 132.83, 131.65, 131.12, 130.56, 130.44, 129.07, 127.84, 127.73, 125.34, 125.24, 123.19, 122.01, 105.51, 105.22, 47.89, 31.71. ESI HRMS m/z=460.9317 [M+H]$^+$, m/z=482.9137 [M+Na]$^+$ calc. for $C_{19}H_{15}Br_2N_2S$=459.93.

Fluorescence Quantum Yield Measurement

The photoluminescence quantum yield (F) was calculated by the following Equation.

$$\Phi_s = \Phi_{ref} \times \left(\frac{Grad_s}{Grad_{ref}}\right) \times \left(\frac{\eta_s}{\eta_{ref}}\right)^2$$

When the subscripts ref and s denote reference and test respectively, Grad is the gradients of the plots of fluorescence quantum yield, integrated fluorescence intensity, and absorbance, and η is the refractive index of the solvent. Rhodamine 6G (F=0.94 in ethanol) was used as reference 1.

Generation of Reactive Oxygen Species (ROS)/Reactive Nitrogen Species (RNS)

$H_2O_2$ was diluted in a 28% solution of water, and tert-butyl hydroperoxide was diluted in a 70% solution of water. ROO$^-$ was produced from 2,2'-Azobis(2-amidinopropane) dihydrochloride, and NO$^-$ was produced from sodium nitroferricyanide(III) dihydrate (SNP), and —OH was produced from the reaction of iron (II) chloride and $H_2O_2$. ONOO$^-$ was prepared according to the previous literature (Halliwell, B., Evans, P., Whiteman, M., 1999. Methods Enzymol. 301, 333-342.), and the concentration was determined by absorbance at 302 nm. NaClO was obtained by diluting a 5% solution in water. ROS or reactive nitrogen species (RNS) were cultivated together with the probe in a mixture of PBS (pH 7.4)/THF (5/5) for 15 minutes.

LOD Calculation

The detection limit was calculated according to the literature (Shrivastava, A. and Gupta, V. B., 2011. Chron. Young Sci. 1, 21-25).

The linear correction curve is expressed as y=a+bx, and is the response y which is linearly related to the concentration x related to the concentration limit range. This model is used to determine the sensitivity (b) and LOD values. The limit of detection (LOD) is calculated by the following Equation:

$$LOD = 3 \times S_a/b$$

(where $S_a$ is the standard deviation of the response and b is the slope of the correction curve.)

Reaction of ClO⁻ with DSM 0.1 mL of NaClO solution (5%) was slowly added to 100 mg of a DSM solution in 25 mL of CH$_3$CN with stirring for 30 minutes. The solvent was removed under reduced pressure, and the residue was purified by silica gel column chromatography using MC/MeOH (from 9/1) as an eluent to obtain a white solid as a main product (DSM) (yield of up to 91%).

DIM: $^1$H NMR (400 MHz, DMSO-d$_6$) δ 9.90-9.85 (m, 1H), 8.68 (d, J=1.1 Hz, 1H), 8.55 (d, J=1.0 Hz, 1H), 8.27-8.21 (m, 1H), 8.21-8.14 (m, 1H), 8.08 (d, J=2.0 Hz, 1H), 7.73-7.62 (m, 3H), 7.33 (d, J=8.3 Hz, 1H), 5.86 (s, 2H), 4.21-4.16 (m, 3H); $^{13}$C NMR (101 MHz, DMSO-D$_6$) δ 147.38, 135.14, 132.27, 131.86, 131.35, 131.10, 131.01, 130.96, 130.07, 128.31, 128.27, 126.78, 124.01, 122.83, 111.33, 110.93, 49.87, 40.13, 33.59; ESI HRMS m/z=428.9602 [M]⁺, calc. for C$_{19}$H$_{15}$Br$_2$N$_2$=428.96.

Bacteria Experiment

After treating a solution of imidazoline-2-thiones (R$_1$SR$_2$) with E. Coli, S. Aureus, ESBL EC, EC GFP, and MRSA bacteria, and incubating the treated solution of imidazoline-2-thiones for 30 minutes, cytotoxicity evaluation was performed.

Hypochlorous acid (ClO⁻) was incubated in the solution of imidazoline-2-thiones (R$_1$SR$_2$) for 10 minutes to perform hypochlorous acid detection fluorescence signal and bioimaging.

Three strains of gram-negative bacteria (E. Coli, ESBL EC, EC GFP) and two strains of gram-negative bacteria (S. Aureus, MRSA) were purchased from KCTC (Korean Collection for Type Cultures) of KRIBB (Korea Research Institute of Bioscience and Biotechnology). Log phase cultures of bacterial strains were diluted in an LB broth and inoculated into microplates at a final concentration of 10⁶ CFU/mL. R$_1$IR$_2$ and R$_1$SR$_2$ were serially diluted in the LB broth to be diluted 2-fold, and inoculated into the microplates (128, 64, 32, 16, 8, 4, 2, 1 μM). The microplates were incubated at 37° C. for 18 hours, and absorbance at 600 nm was measured using a FilterMax™ F5 Multi-Mode Microplate Reader (Molecular Devices, USA).

The CFU ratio (%) was calculated as the ratio of CFU values between bacteria that are treated with a reagent and bacteria that are not treated with the reagent. In order to compare the antimicrobial activities between a pair of R$_1$IR$_2$ and R$_1$SR$_2$, the concentration (μM) (CFU$_{50}$) was calculated. Here, the CFU ratio is 50%, and is $$P = \frac{CFU_{50(R_1IR_2)}}{CFU_{50(R_1SR_2)}}$$

between a pair of an imidazole salt and imidazoline-2-thione. Imidazoline-2-thione is higher than 128 μM.

Figure 2A:
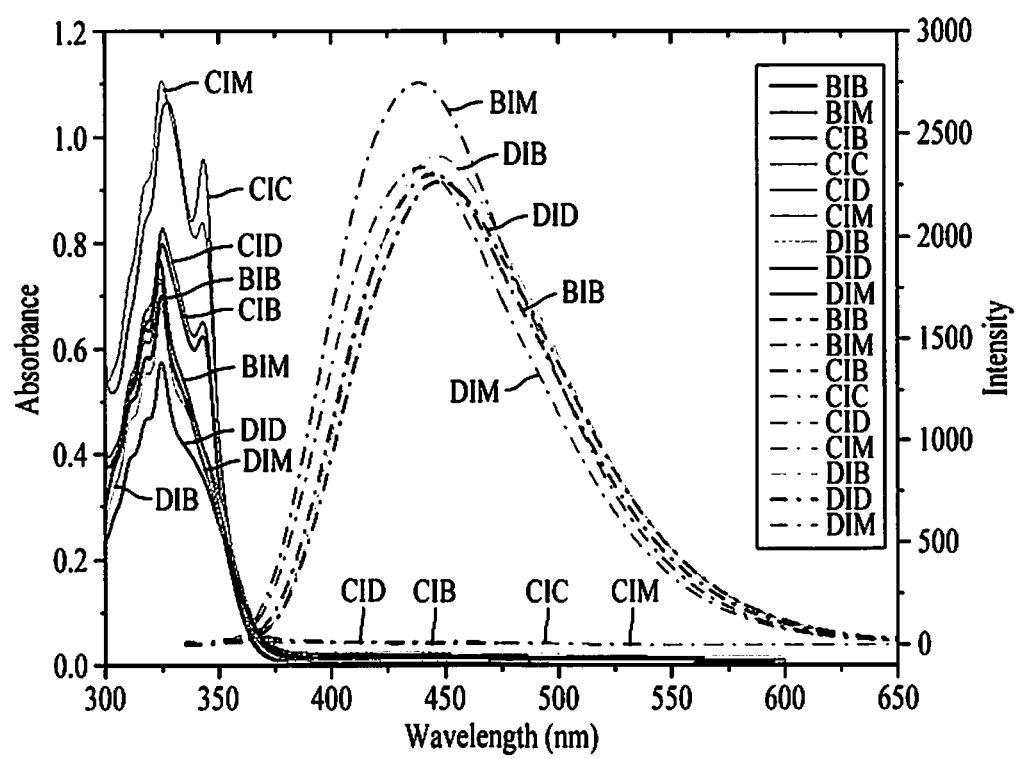
FIG. 2A and FIG. 2B show results of measuring UV-Vis (solid lines) and fluorescence emission (dashed lines) spectra of (2A) $R_1IR_2$ series (80 μM) (in ACN) and (2B) $R_1SR_2$ series (10 μM) (in ACN) prepared in Example of the present disclosure, according to an example embodiment of the present disclosure.
Figure 2B:
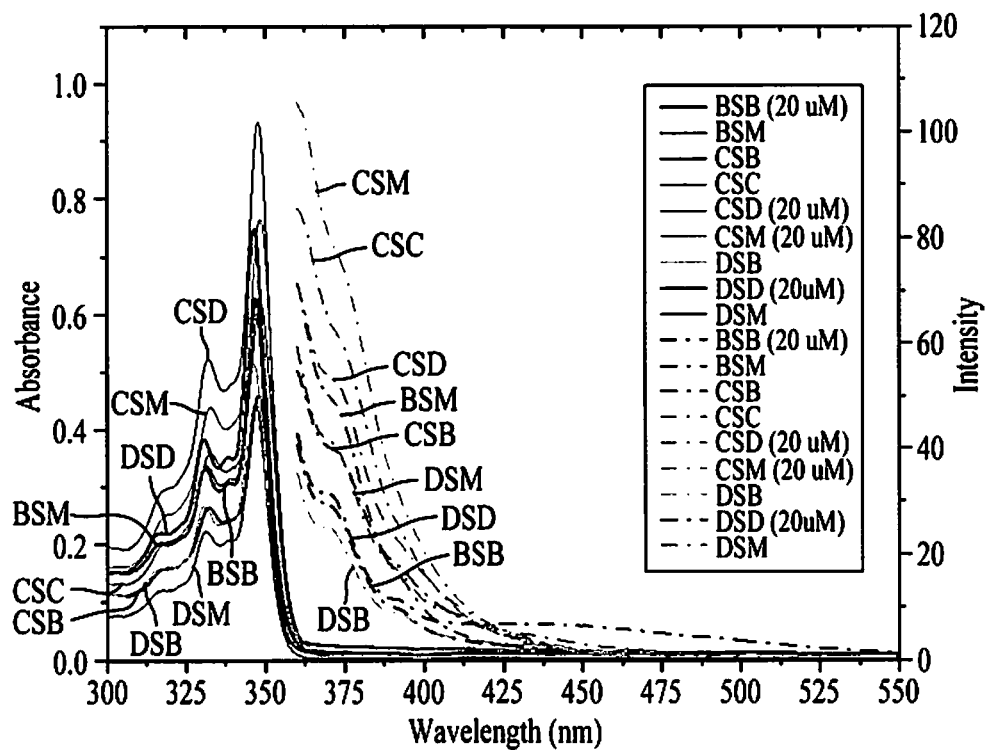

FIG. 2 shows results of measuring UV-Vis (solid lines) and fluorescence emission (dashed lines) spectra of (2A) R$_1$IR$_2$ (80 μM) (in ACN) and (2B) R$_1$SR$_2$ (10 μM) (in ACN) prepared in Example of the present disclosure, according to an example embodiment of the present disclosure.

Figure 3A:
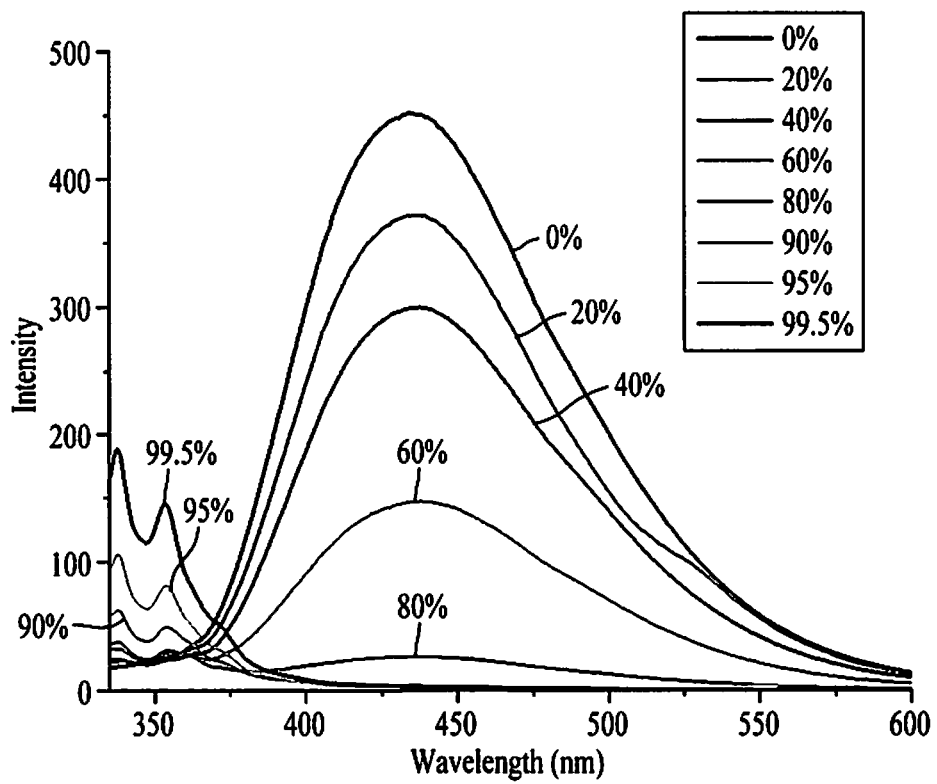
FIG. 3A and FIG. 3B show fluorescence intensities at the fluorescence emission spectrum of DIM (5 μM) in (3A) DMF/Tol (0 to 99.5%) and at the emission wavelength of DIM (5 μM) in (3B) DMF/PBS 7.4 and DMF/Tol (0 to 99.5%) of the compound prepared in Example of the present disclosure, according to an example embodiment of the present disclosure.
Figure 3B:
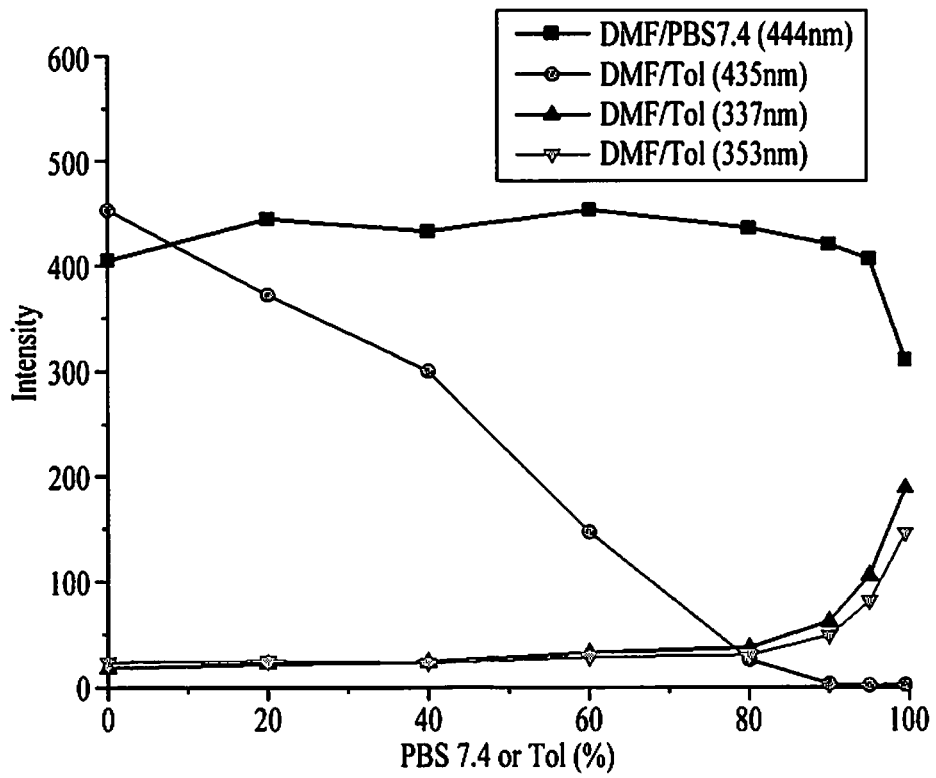

FIG. 3 shows fluorescence intensities at the fluorescence emission spectrum of DIM (5 μM) in (3A) DMF/Tol (0 to 99.5%) and at the emission wavelength of DIM (5 μM) in (3B) DMF/PBS 7.4 and DMF/Tol (0 to 99.5%) of the compound prepared in Example of the present disclosure.

Figure 4A:
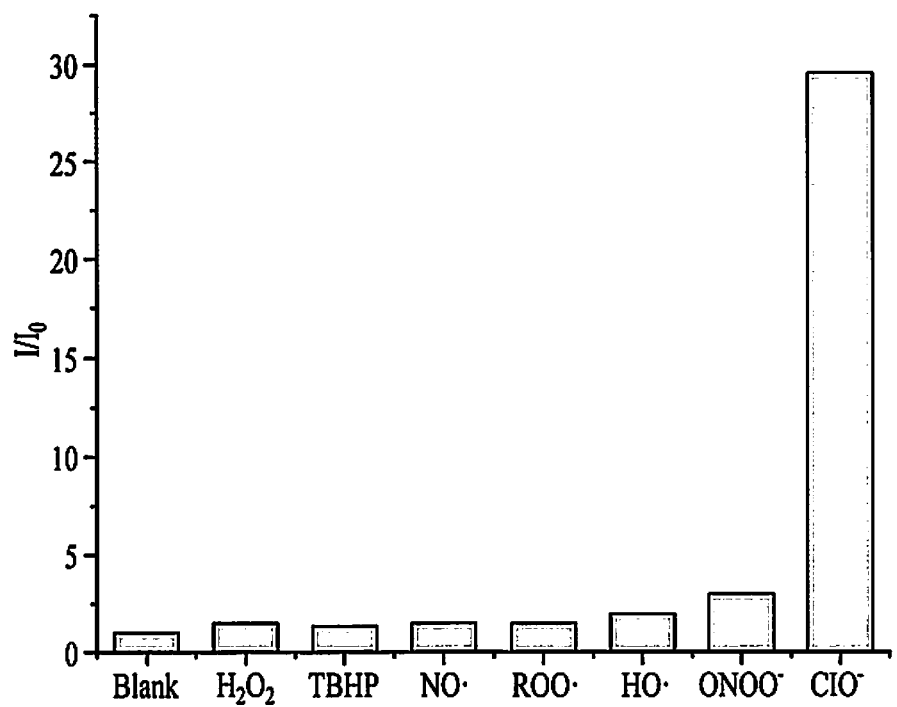
FIG. 4A and FIG. 4B exemplarily show (4A) fluorescence intensity ratios ($I/I_0$) of DSM (5 μM) in PBS 7.4 (0.5% DMF) in the presence of ClO$^-$ (50 μM), ROO. (1 mM), NO. (1 mM), $H_2O_2$ (1 mM), TBHP (1 mM), ONOO$^-$ (200 μM), and —OH (200 μM) and (4B) the desulfurization mechanism of DSM by hypochlorous acid (ClO$^-$) of the compound prepared in Example of the present disclosure, according to an example embodiment of the present disclosure.
Figure 4B:
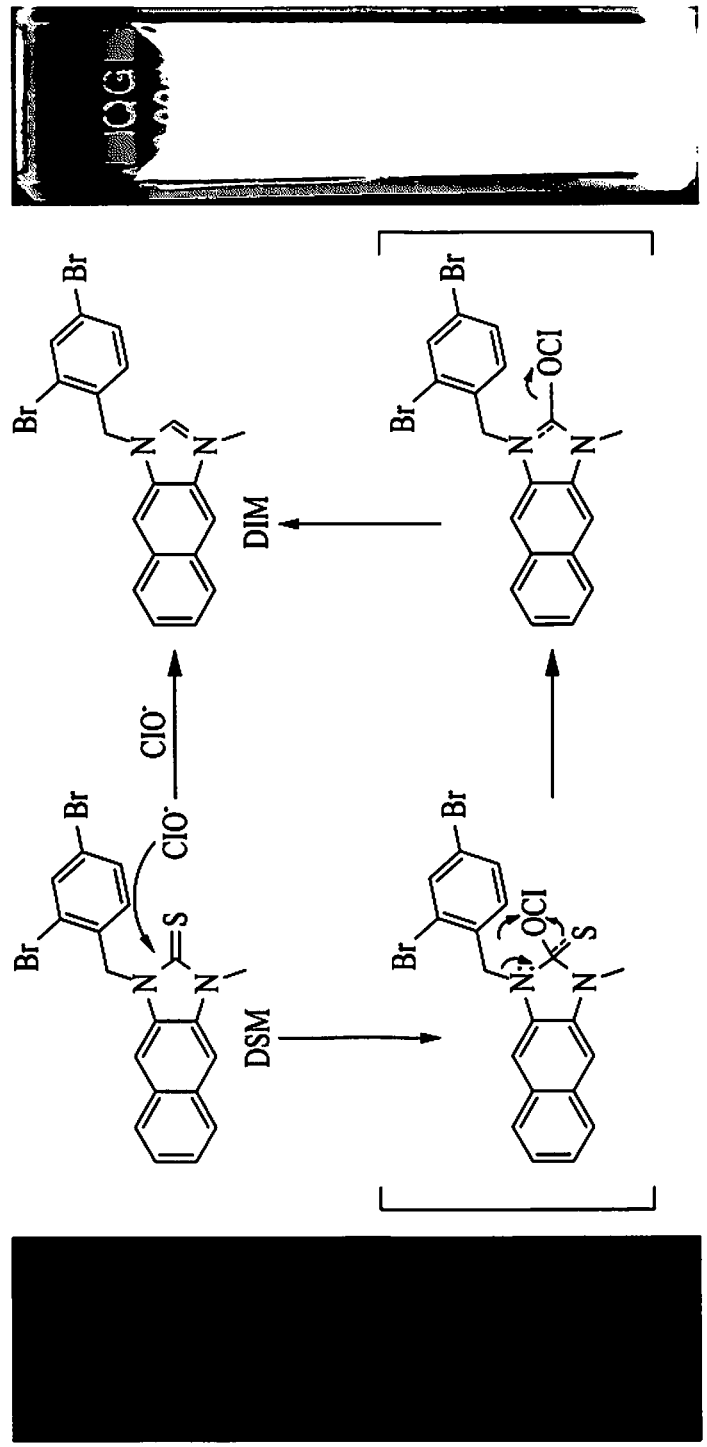

FIG. 4 exemplarily shows (4A) fluorescence intensity ratios (I/I$_0$) of DSM (5 μM) in PBS 7.4 (0.5% DMF) in the presence of ClO⁻(50 μM), ROO— (1 mM), NO— (1 mM), H$_2$O$_2$ (1 mM), TBHP (1 mM), ONOO⁻(200 μM), and —OH (200 μM) and (4B) the desulfurization mechanism of DSM by hypochlorous acid (ClO⁻) of the compound prepared in Example of the present disclosure.

Figure 5A:
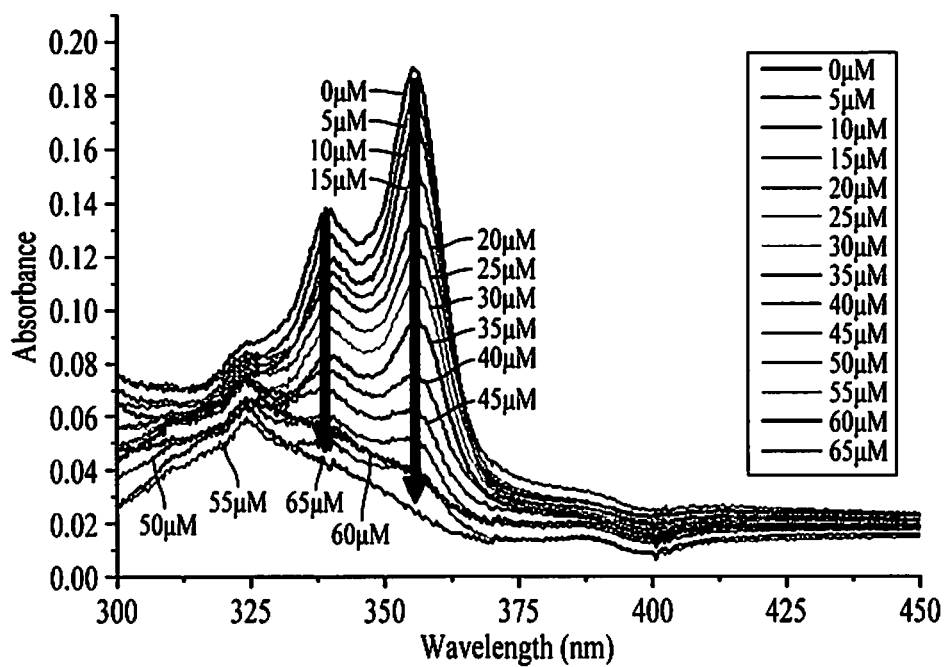
FIG. 5A and FIG. 5B show UV-vis absorption and fluorescence emission spectra ($\lambda_{ex}$=325 nm; slit 5/5) of DSM (5 μM) according to the treatment of ClO$^-$ (0 to 65 μM) in PBS 7.4 (0.05% DMF) in Example of the present disclosure, according to an example embodiment of the present disclosure.
Figure 5B:
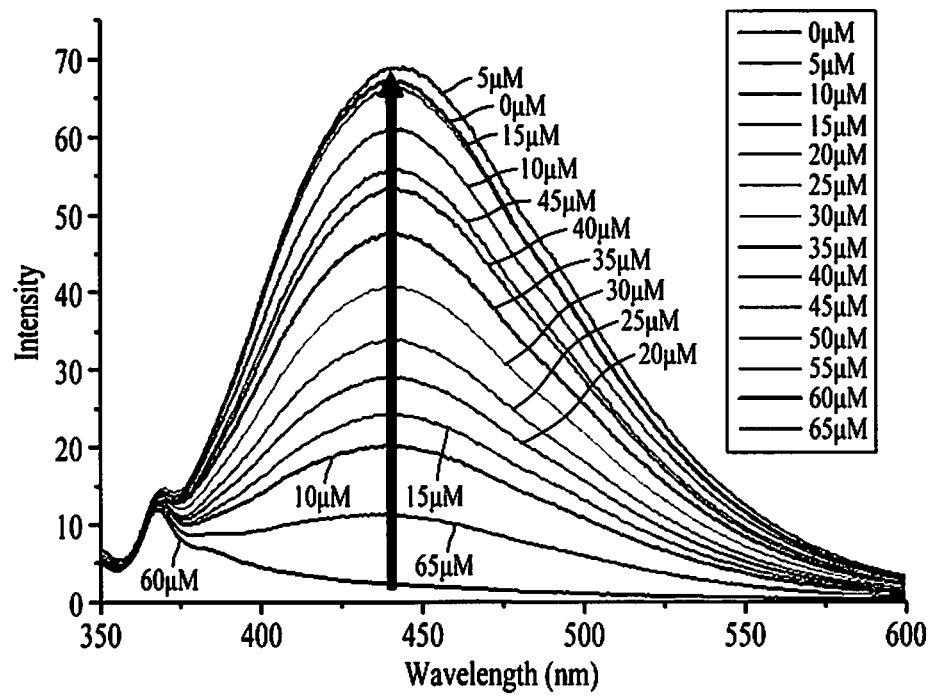

FIG. 5 shows UV-vis absorption and fluorescence emission spectra (λ$_{ex}$=325 nm; slit 5/5) of DSM (5 μM) according to the treatment of ClO⁻(0 to 65 μM) in PBS 7.4 (0.05% DMF) in Example of the present disclosure, according to an example embodiment of the present disclosure.

In the present disclosure, imidazole salt (R$_1$IR$_2$) and imidazoline-2-thione (R$_1$SR$_2$) series were synthesized, and their characteristics were analyzed by H-NMR, C-NMR, mass spectrum, crystallization structure, and DFT calculation-based molecular orbital. Their excitation wavelengths were calculated by the TD-DFT method with various functions and default settings.

Their photophysical properties were investigated by UV-Vis absorption, fluorescence emission spectra, and DFT calculation-based two-photon absorption. The imidazole salt (R$_1$IR$_2$) shows high emission, but introduction of a carbazole moiety suppressed their fluorescence emission, and the imidazoline-2-thione shows weak emission. Such an antimicrobial activity was investigated in E. Coli, S. Aureus, ESBL EC, EC GFP and MRSA, it may be seen that DSM and DIM; DID and DSD show high antibacterial activity, and this is useful for the design of OFF-ON antibacterial probes. However, DSD hardly reacts with ClO⁻ due to steric hindrance. DIM showed agglutination-enhanced emission useful for bacteria imaging, and DSM showed high selective ClO⁻ reactivity with LOD=0.13 μM compared to other ROS/RNS. Finally, it was confirmed that the DSM probe was tested in bacteria according to ClO⁻ treatment so that it was converted to DIM by high emission under two-photon excitation, and inhibited bacterial growth.

The present disclosure provides imidazoline-2-thiones (R$_1$ SR$_2$), which are novel probes that are pure organic substances that do not contain heavy metals, and these may be used as a fluorescence imaging die that may selectively detect hypochlorous acid (ClO⁻) in intracellular ROS while exhibiting an excellent antibacterial effect on super bacteria that are resistant to antibiotics.

Although the above-mentioned examples have been described by limited Examples and drawings, those skilled in the art may apply various modifications and alterations from the above-mentioned description. For example, appropriate results may be achieved although described techniques are carried out in a different order from a described method, and/or described elements are combined or mixed in a different form from the described method, or replaced or substituted with other elements or equivalents. Therefore, other implementations, other Examples, and equivalents to patent claims belong to the scope of the patent claims to be described later.

What is claimed is:

1. A compound represented by the following Chemical Formula 1 or a salt thereof:

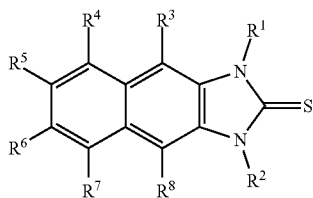

[Chemical Formula 1]

wherein in Chemical Formula 1, $R^1$ to $R^2$ are each selected from hydrogen; halogen; linear or branched $C_1$-$C_{30}$ alkyl; $C_2$-$C_{30}$ alkenyl; $C_2$-$C_{30}$ alkynyl; a substituted or unsubstituted $C_5$-$C_{30}$ single or polycyclic aryl group; a substituted or unsubstituted $C_5$-$C_{30}$ heteroatomic single or polycyclic aryl group; and —R-L wherein R is $C_1$-$C_{30}$ alkylene or $C_2$-$C_{30}$ alkenylene, and L is selected from a substituted or unsubstituted $C_6$-$C_{30}$ single or polycyclic aryl group; and a substituted or unsubstituted $C_5$-$C_{30}$ heteroatomic single or polycyclic aryl group, in the polycyclic aryl group, two or more aromatic rings are condensed, or two or more aromatic rings are connected, wherein substituted is substituted with at least one substituent of heavy hydrogen, halogen, linear or branched $C_1$-$C_{30}$ alkyl, and $C_2$-$C_{30}$ alkenyl, and $R^3$ to $R^8$ are each selected from hydrogen, halogen, linear or branched $C_1$-$C_{30}$ alkyl, and $C_2$-$C_{30}$ alkenyl, wherein at least one of $R^1$ to $R^2$ above is selected from the following:

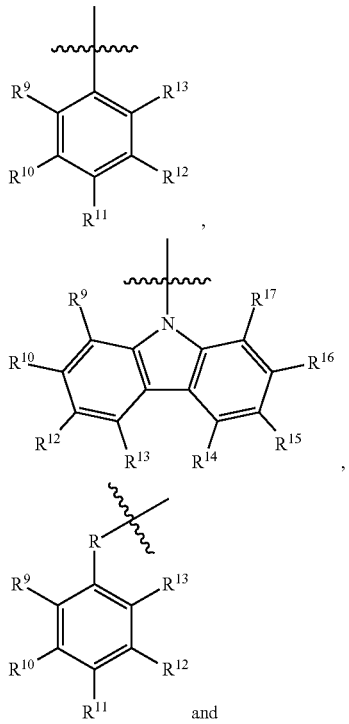

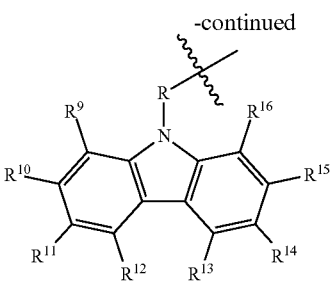

and wherein R is $C_1$-$C_{30}$ alkylene or $C_2$-$C_{30}$ alkenylene, and $R^9$ to $R^{17}$ are each selected from hydrogen, halogen, linear or branched $C_1$-$C_{20}$ alkyl, and $C_2$-$C_{20}$ alkenyl.

2. The compound of claim 1, wherein the compound has fluorescence imaging and antibacterial functions for hypochlorous acid ($OCl^-$).

3. A composition comprising the compound represented by Chemical Formula 1 of claim 1, a salt thereof, or both thereof.

4. The composition of claim 3, wherein the salt is a pharmaceutically acceptable salt, and the composition is an antibacterial composition having antibacterial activity.

5. The composition of claim 3, wherein the composition further comprises water, an organic solvent, or both thereof, and has a pH of 7 to 8.

6. A probe for detecting bacteria, comprising the compound represented by Chemical Formula 1 of claim 1, a salt thereof, or both thereof, and having a selective optical property change for hypochlorous acid ($OCl^-$) in bacterially infected cells.

7. The probe of claim 6, wherein the probe for detecting bacteria has an antibacterial function.

8. A sensor for a detection of hypochlorous acid ($OCl^-$), comprising the compound represented by Chemical Formula 1 of claim 1, a salt thereof, or both thereof, and having a selective optical property change for hypochlorous acid ($OCl^-$).

9. The sensor of claim 8, wherein the sensor is a fluorescent sensor, and the sensor measures a fluorescence signal or performs fluorescence imaging.

10. The sensor of claim 8, wherein the sensor measures a change in fluorescence intensity according to the following Equation 1:

$$(I/I_0) \geq 10 \qquad \text{[Equation 1]}$$

wherein: I is fluorescence intensity after hypochlorous acid ($OCl^-$) contact, $I_0$ is initial fluorescence intensity.

11. The sensor of claim 8, wherein the sensor has a detection limit for hypochlorous acid ($OCl^-$) of 5 µM or less.

12. The compound of claim 1, wherein one of $R^1$ to $R^2$ above is selected from hydrogen, halogen, linear or branched $C_1$-$C_{30}$ alkyl, and $C_2$-$C_{30}$ alkenyl.

* * * * *